United States Patent [19]
Olazabal et al.

[11] Patent Number: 5,323,148
[45] Date of Patent: Jun. 21, 1994

[54] SELECTIVE CALL RECEIVER PRESENTING THE LENGTH OF AN ALPHANUMERIC MESSAGE PRIOR TO PRESENTATION OF THE MESSAGE

[75] Inventors: Jorge L. Olazabal, Tamarac; Silvia M. Viteri, Lantana, both of Fla.

[73] Assignee: Motorola, Inc., Schaumburg, Ill.

[21] Appl. No.: 28,713

[22] Filed: Mar. 9, 1993

Related U.S. Application Data

[63] Continuation of Ser. No. 661,929, Feb. 28, 1991, abandoned.

[51] Int. Cl.⁵ .............................................. H04Q 1/00
[52] U.S. Cl. .............................. 340/825.44; 455/38.4; 379/56; 379/67
[58] Field of Search ...................... 340/825.44, 825.17; 455/38.4; 379/67, 56, 57, 75

[56] References Cited

U.S. PATENT DOCUMENTS

| | | | |
|---|---|---|---|
| 4,336,524 | 6/1982 | Levine | 340/825.44 |
| 4,722,077 | 1/1988 | Jachmann et al. | 379/75 |
| 4,766,434 | 8/1988 | Matai et al. | 340/825.44 |
| 4,860,339 | 8/1989 | D'Agosto, III et al. | 379/67 |

*Primary Examiner*—Donald J. Yusko
*Assistant Examiner*—Brian Zimmerman
*Attorney, Agent, or Firm*—Kelly A. Gardner; Thomas G. Berry; Daniel R. Collopy

[57] ABSTRACT

A selective call receiver (10) for receiving and presenting messages comprises a receiver (12) for receiving the messages and a memory (14) for storing the received messages. A processor (13) calculates the length of certain types of stored messages, and, for those types of messages, the length of the message is displayed prior to presenting the message.

20 Claims, 3 Drawing Sheets

— PRIOR ART —

SELECTIVE CALL RECEIVER PRESENTING THE LENGTH OF AN ALPHANUMERIC MESSAGE PRIOR TO PRESENTATION OF THE MESSAGE

This is a continuation of application Ser. No. 07/661,929, filed Feb. 28, 1991, now abandoned.

FIELD OF THE INVENTION

This invention relates in general to message presentation devices and more specifically to a selective call receiver presenting messages subsequent to an alert.

BACKGROUND OF THE INVENTION

Selective call radio receivers such as pagers alert a user of a received message. Such devices generally incorporate a radio receiver capable of producing either an audible alert which may be heard by the user or a tactile alert such as a vibrating sensation which may be felt by the user. Some pagers provide the additional features of a voice message following the alert or a message visually displayed on a screen.

Each selective call receiver is identified by a specific address that typically precedes each message. When a selective call receiver receives a message including the selective call receiver address, the message is stored within a memory. The message may be short, e.g., a phone number, or it may be long, e.g., a detailed business report or a facsimile. As advances in technology provide for greater capability of storing these received messages as digital information, the length of messages transmitted will increase.

Receiving long messages may provide a dilemma for the user of the selective call receiver in that the user may be in a situation in which it is not desirable to take the time to read the long message. However, the user previously was unable to determine the length of the received message prior to reading the message. Therefore, the user could have initiated the reading of a long message only having to stop part way through the message, thereby wasting time and concentration.

SUMMARY OF THE INVENTION

An apparatus for receiving and presenting selective call messages comprises a receiver for receiving a selective call message, a memory for storing the received selective call message, and a processor for determining whether the stored selective call message is an alphanumeric message. The processor calculates the length of the selective call message in response to determining that the selective call message is an alphanumeric message. A presentation device coupled to the processor presents the length of the selective call message prior to presenting the selective call message when the selective call message is an alphanumeric message.

A selective call receiver comprises a receiver, a memory, and a processor coupled to the receiver and the memory for controlling the operation thereof. A method for presenting different types of selective call messages received by the selective call receiver comprises the steps of receiving a selective call message with the receiver, storing the received message in the memory, and determining whether the stored message is a facsimile message. The method further comprises the steps of calculating the length of the stored message in response to determining that the stored message is a facsimile message and presenting the length of the stored message prior to presenting the stored message when the stored message is a facsimile message.

DESCRIPTION OF A PREFERRED EMBODIMENT

Figure 1:
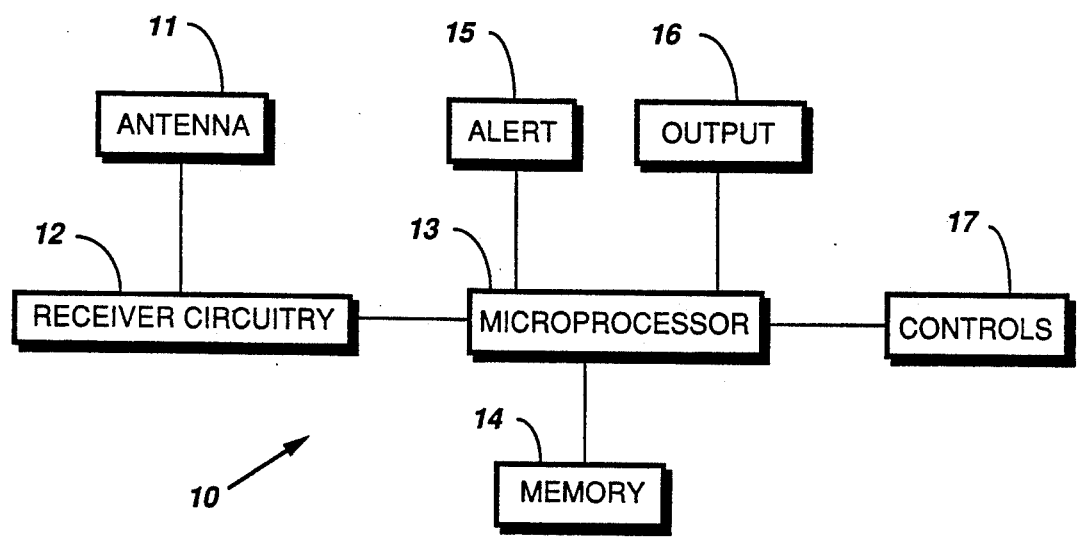
FIG. 1 is a block diagram of a known selective call receiver.

Referring to FIG. 1, an apparatus for receiving messages such as a selective call receiver 10 comprises an antenna 11 for receiving signals coupled to a receiver circuit 12 which demodulates the signals received. A memory 14 is coupled to a microprocessor 13 for storing those messages containing the address of the selective call receiver as determined by the microprocessor 13. The microprocessor 13 also controls the storing and recalling of those messages in a manner well known to one skilled in the art. An alert device 15 provides an alert, e.g., audible, visual or tactile, to the user that a message has been received and is ready to be presented. An output device 16 may be, for example, a visual display such as a liquid crystal display controlled by the microprocessor 13. The controls 17 allow the user to command the microprocessor 13 to perform the selective call receiver operations well known to those skilled in the art and may include control switches such as on/off control, function control, select, cursor movement, etc. Although the preferred embodiment is described as a selective call receiver, the invention described herein may be used with any type of message presentation device. For example, the messages could be sent without an address identifying specific receivers, and the messages may be transmitted other than as a radio frequency signal.

Figure 2:
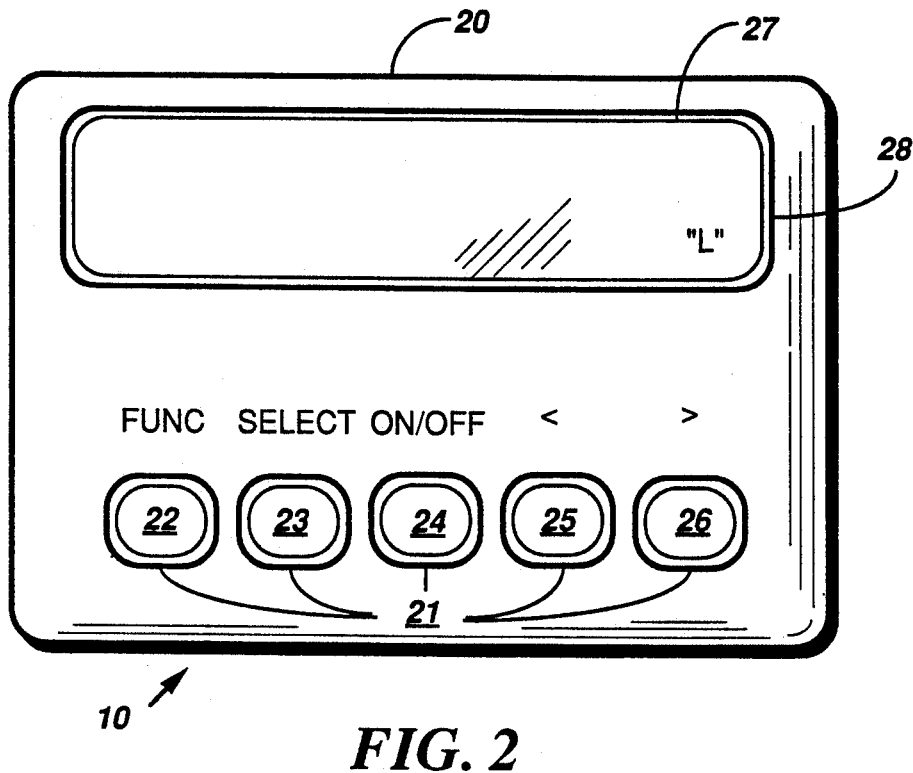
FIG. 2 is a top view of a known selective call receiver.

Referring to FIG. 2, the selective call receiver 10 comprises a housing 20 including openings 21 therein with user control buttons 22, 23, 24, 25 and 26 accessible therethrough. A display device 27 such as a liquid crystal display (LCD) for at least a one line alphanumeric display is viewable through another opening 28. A cursor is moved one position to the left for each depression of the user selectable directional button 25 and one position to the right for each depression of the user selectable directional button 26. By depressing the function button 22, a particular function such as present message length "L" will be illustrated on the display 27. The select button 23 allows the user to select the displayed function.

Figure 3:
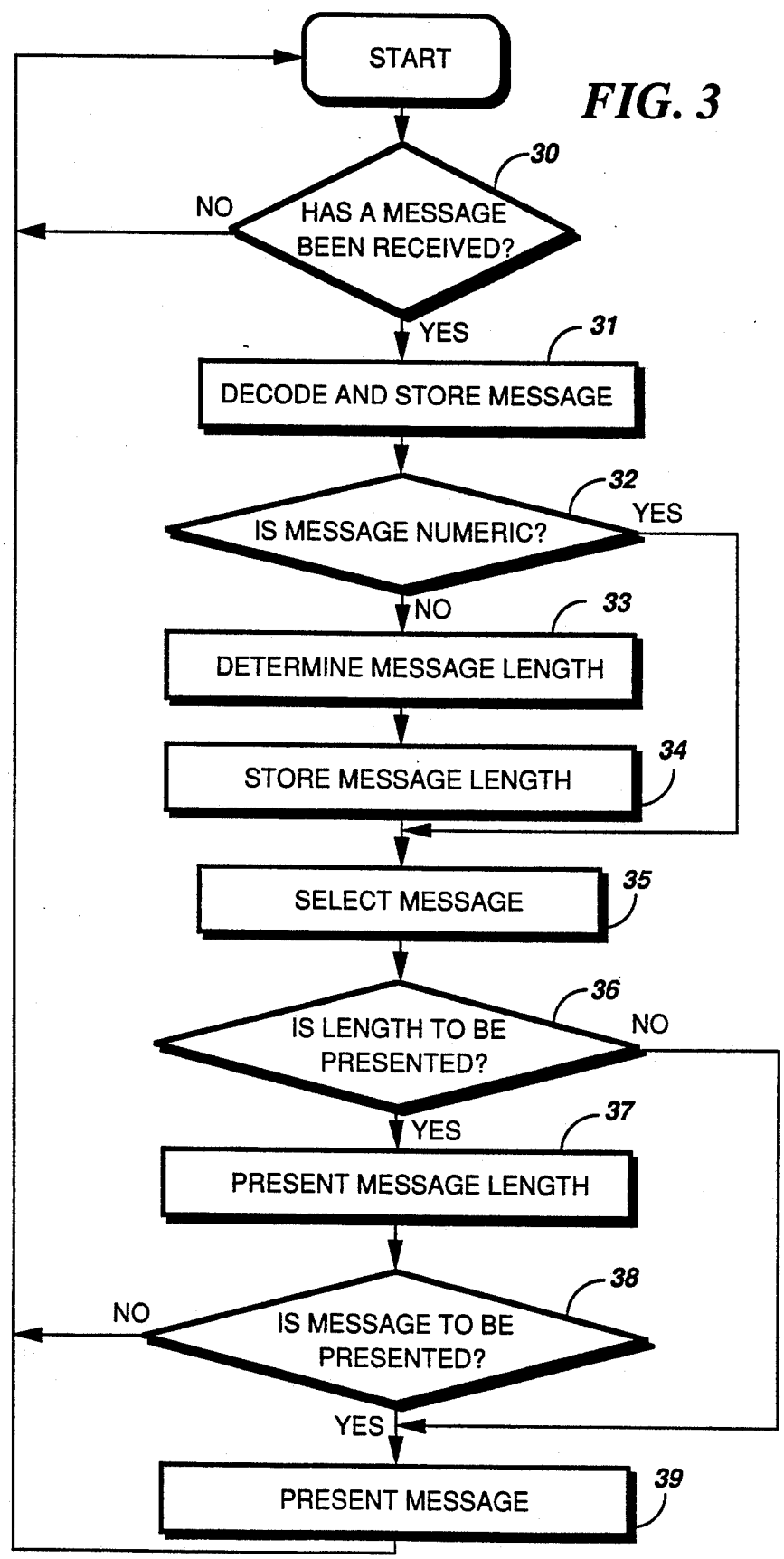
FIG. 3 is a flow chart illustrating an embodiment of the present invention.

Referring to FIG. 3, the method according to the preferred embodiment of the present invention comprises the receiver 12 receiving 30 a message and decoding 31 the message prior to storing 31 the message in memory 14. If the message is of a first type 32, e.g., alphanumeric or facsimile, the message length is calculated 33 by the microprocessor 13 (e.g., by counting characters in a manner well known to those skilled in the art) and stored 34 in the memory 14. Alternatively, the calculation of the message length may be accomplished while the message is being stored, wherein the determination of whether the message is of a first type would be made prior to the message being stored. The message is then selected 35. This selection, for example, may be automatic upon receipt of the message, or it may comprise a manual depression of the select button 23.

Figure 4A:
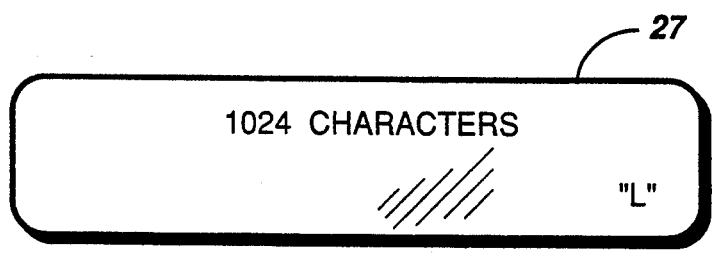
FIGS. 4A, 4B, and 4C are three top views of a display showing three examples of the indication of message length.
Figure 4B:
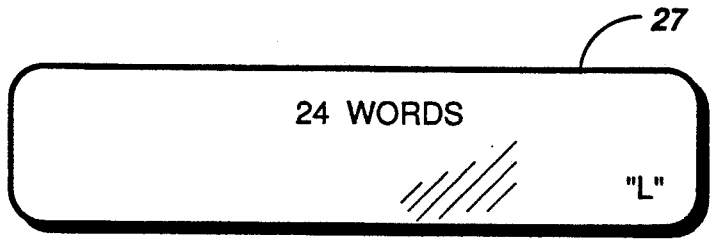
Figure 4C:
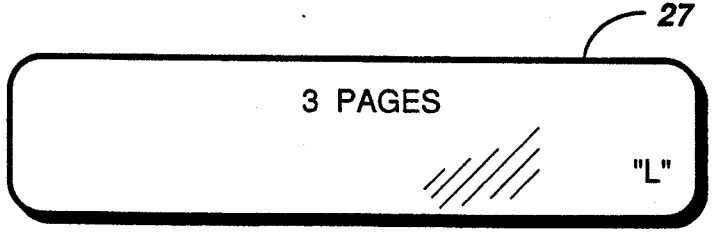

The presentation 37 of the length of the message may be automatic or it may be selectable, e.g., by manipulation of the function and select buttons 22 and 23, respectively. If the length of the message is to be presented, the length may be expressed 37, for example, in characters (FIG. 4A), words (FIG. 4B), pages (FIG. 4C). The number of words may be determined, for example, by counting characters representing "spaces" between words. In the preferred embodiment, the pages may represent screens, e.g., the information capable of being presented on one screen is one page. In another embodiment, the pages may represent pages of a document. The length of a page would be, for example, the number of characters or words that would "fit" on a page. After the length is presented, in the preferred embodiment the user would decide if it is desirable to read the message and if so, select 38 the message for presentation 39. In an alternate embodiment, the message would be presented automatically.

By knowing the length of a received message before displaying the message, the user may postpone reading the message until a more suitable time. In other words, the user may quickly check the length of the received message, but continue with other actions by postponing the reading of the long message until a later time. Additionally, in another embodiment, the user may prefer to couple the selective call receiver to another device such as a printer for printing the long message.

We claim:

1. An apparatus for receiving and presenting selective call messages, comprising:
   receiver means for receiving a selective call message;
   memory means for storing the received selective call message;
   processor means for determining whether the stored selective call message is an alphanumeric message, wherein the processor means calculates the length of the selective call message in response to determining that the selective call message is an alphanumeric message; and
   presentation means coupled to the processor means for presenting the length of the selective call message prior to presenting the selective call message when the selective call message is an alphanumeric message.

2. The apparatus according to claim 1 wherein the presentation means presents the length as a number of characters.

3. The apparatus according to claim 1 wherein the presentation means presents the length as a number of words.

4. The apparatus according to claim 1 wherein the presentation means presents the length as a number of pages.

5. An apparatus for receiving and presenting different types of selective call messages, comprising:
   receiver means for receiving a selective call message;
   memory means for storing the received selective call message;
   processor means coupled to the receiver means and the memory means for determining whether the selective call message is a facsimile message, wherein the processor means calculates the length of the selective call message in response to determining that the selective call message is a facsimile message; and
   presentation means coupled to the processor means for presenting the length of the selective call message prior to presenting the selective call message when the selective call message is a facsimile message.

6. The apparatus according to claim 5 wherein the presentation means presents the length as a number of characters.

7. The apparatus according to claim 5 wherein the presentation means presents the length as a number of words.

8. The apparatus according to claim 5 wherein the presentation means presents the length as a number of pages.

9. A method for presenting different types of selective call messages in a selective call receiver comprising a receiver, a memory, and a processor coupled to the receiver and the memory for controlling the operation thereof, the method comprising the steps of:
   receiving a selective call message with the receiver;
   storing the received message in the memory;
   determining whether the stored message is a facsimile message;
   calculating the length of the stored message in response to determining that the stored message is a facsimile message; and
   presenting the length of the stored message prior to presenting the stored message when the stored message is a facsimile message.

10. The method according to claim 9 wherein the presenting step comprises presenting the length as a number of characters.

11. The method according to claim 9 wherein the presenting step comprises presenting the length as a number of words.

12. The method according to claim 9 wherein the presenting step comprises presenting the length as a number of pages.

13. A method for presenting selective call messages in a selective call receiver comprising a receiver, a memory, and a processor coupled to the receiver and the memory for controlling the operation thereof, the method comprising the steps of:
   receiving a selective call message with the receiver;
   storing the received message in the memory;
   determining whether the stored message is an alphanumeric message;
   calculating the length of the stored message in response to determining that the stored message is an alphanumeric message; and
   presenting the length of the stored message prior to presenting the stored message when the stored message is an alphanumeric message.

14. The method according to claim 13 wherein the presenting step comprises presenting the length as a number of characters.

15. The method according to claim 13 wherein the presenting step comprises presenting the length as a number of words.

16. The method according to claim 13 wherein the presenting step comprises presenting the length as a number of pages.

17. A selective call receiver having receiver means for receiving and decoding selective call messages, the selective call receiver comprising:

memory means coupled to the receiver means for storing a selective call message received and decoded by the receiver means;

determining means coupled to the memory means for determining whether the stored selective call message is an alphanumeric message;

processing means coupled to the memory means and the determining means for calculating, in response to the determining means determining that the stored selective call message is an alphanumeric message, the length of the stored selective call message; and presentation means coupled to the processing means and the memory means for presenting the length of the stored selective call message when the selective call message is an alphanumeric message.

18. The selective call message according to claim 17 wherein the presentation means presents the length as a number of words included within the selective call message.

19. The selective call message according to claim 17 wherein the presentation means presents the length as a number of pages included within the selective call message.

20. The selective call message according to claim 17 wherein the presentation means presents the length as a number of characters included within the selective call message.

* * * * *